(12) United States Patent
Kiefer et al.

(10) Patent No.: US 9,640,827 B2
(45) Date of Patent: May 2, 2017

(54) METHOD FOR OPERATING A FUEL CELL SYSTEM

(71) Applicant: ElringKlinger AG, Dettingen (DE)

(72) Inventors: Thomas Kiefer, Bad Urach (DE); André Weber, Karlsruhe (DE)

(73) Assignee: ElringKlinger AG, Dettingen (DE)

( * ) Notice: Subject to any disclaimer, the term of this patent is extended or adjusted under 35 U.S.C. 154(b) by 115 days.

(21) Appl. No.: 14/619,402

(22) Filed: Feb. 11, 2015

(65) Prior Publication Data

US 2015/0155587 A1 Jun. 4, 2015

Related U.S. Application Data

(63) Continuation of application No. PCT/EP2013/061110, filed on May 29, 2013.

(30) Foreign Application Priority Data

Aug. 14, 2012 (DE) ........................ 10 2012 214 435

(51) Int. Cl.
| | | |
|---|---|---|
| H01M 8/22 | (2006.01) | |
| H01M 8/06 | (2016.01) | |
| H01M 8/0612 | (2016.01) | |
| H01M 8/0662 | (2016.01) | |
| H01M 8/12 | (2016.01) | |
| H01M 8/04223 | (2016.01) | |
| H01M 8/2465 | (2016.01) | |

(52) U.S. Cl.
CPC ....... *H01M 8/222* (2013.01); *H01M 8/04223* (2013.01); *H01M 8/0618* (2013.01); *H01M 8/0662* (2013.01); *H01M 8/12* (2013.01); *H01M 8/2465* (2013.01)

(58) Field of Classification Search
CPC .............. H01M 8/222; H01M 8/0618; H01M 8/04223; H01M 8/2465
See application file for complete search history.

(56) References Cited

U.S. PATENT DOCUMENTS

| | | |
|---|---|---|
| 2003/0219371 A1 | 11/2003 | Amendola |
| 2006/0172161 A1* | 8/2006 | Ueda ....................... B01B 1/005 429/411 |

FOREIGN PATENT DOCUMENTS

| | | |
|---|---|---|
| DE | 10 2010 034 271 | 2/2012 |
| EP | 2 028 710 | 2/2009 |
| JP | 2006 244814 | 9/2006 |
| WO | WO 2008/066853 | 6/2008 |
| WO | WO2010/133854 | 11/2010 |

* cited by examiner

*Primary Examiner* — Stewart Fraser
(74) *Attorney, Agent, or Firm* — Womble Carlyle Sandridge & Rice LLP

(57) ABSTRACT

The present invention relates to a method for operating a fuel cell system having a fuel cell stack to which a fuel is supplied on the anode side and an oxidizing agent is supplied on the cathode side, wherein at least during one phase of the operation of the fuel cell system, urea is supplied to the fuel cell stack as a fuel.

13 Claims, 2 Drawing Sheets

METHOD FOR OPERATING A FUEL CELL SYSTEM

CROSS-REFERENCE TO RELATED APPLICATIONS

The present application is a continuation of international application number PCT/EP2013/061110, filed on May 29, 2013, which claims priority to German patent application number 10 2012 214 435.8, filed on Aug. 14, 2012, the entire specification of both being incorporated herein by reference.

FIELD OF DISCLOSURE

The present invention relates to a method for operating a fuel cell system having a fuel cell stack to which a fuel is supplied on the anode side and an oxidizing agent is supplied on the cathode side.

BACKGROUND

Fuel cell systems are used, inter alia, as auxiliary power units (APUs) for generating electrical energy on board motor vehicles. Hydrogen and carbon monoxide serve primarily as fuels that can be supplied to the anodes of the fuel cell stack, wherein these fuel gases are generated by partial oxidation of a conventional fuel (e.g., diesel or petrol) in a reformer connected upstream of the fuel cell stack.

A series of known problems exists in the operation of fuel cell systems of this type, which can lead to a reduction in the efficiency and/or the operating life of the fuel cell stack or make additional measures necessary which themselves worsen the cost/output ratio of the system. These problems arise essentially from the composition of the available fuels and the reformate resulting therefrom and concern, above all (though not exclusively) the start and end phase of the operation of the fuel cell system, in which the fuel cell stack is not yet or is no longer at its optimum operating temperature. In the typically-used high temperature fuel cells, this lies in the region above 700° C.

A general problem is the sulfur content of the fuels which in commercially available diesel fuel, despite the designation "sulfur free", is up to 10 ppm. Although this quantity is still tolerable at an operating temperature of the fuel cell stack of more than 900° C., in the temperature range from 700° C. to 800° C., which is preferable from the standpoint of efficiency, it leads over time to de-activation of the catalyst (particularly nickel) used at the anode, so that carbon monoxide, in particular, is no longer converted (sulfur poisoning). As a countermeasure, a desulfurization unit, which naturally leads to increased costs and an increased need for space, can be connected upstream.

During the start phase of the fuel cell system, the problem arises, firstly, that the fuel cell stack must be heated to the desired operating temperature, which is achieved by means of the pre-heated oxidizing agent (atmospheric oxygen) and possibly the hot reformate whilst, secondly, this reformate has an unfavorable composition for as long as the optimum operating temperature of the reformer has not been reached. Particularly in the range of approximately 300° C. to 600° C., the deposition of soot takes place when the hot reformate makes contact with the still cold anode material, which can lead in the long term to damaging of the anodes. However, heating of the fuel cell stack solely by means of the oxidizing agent is also disadvantageous because the temperature differences arising therefrom between the cathodes and the anodes can lead to thermal stresses and crack formation and because the oxidizing agent can then reach the anodes by way of a downstream residual gas burner. An oxidizing atmosphere at the anodes leads to oxidation of the catalyst (e.g., from nickel to nickel oxide) which, although it is in principle reversible, can however lead to damaging of the anode material.

SUMMARY OF THE INVENTION

It is an object of the invention to propose a method for operating a fuel cell system wherein these problems can be entirely or partially prevented.

This object is achieved with the method of the type mentioned in the introduction in that at least during one phase of the operation of the fuel cell system, urea is supplied to the fuel cell stack as a fuel.

Urea ($H_2N-CO-NH_2$) is the amide of carbonic acid and can be hydrolyzed in the presence of water, initially to carbon dioxide and ammonia:

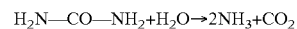

At raised temperatures, ammonia dissociates to hydrogen and nitrogen:

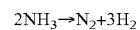

The fuel cell stack used in the context of the present invention preferably comprises a high temperature fuel cell, in particular a solid oxide fuel cell (SOFC). At its preferred operating temperature in the range of 700° C. to 800° C., the thermodynamic equilibrium of the dissociation reaction lies almost entirely on the side of hydrogen and nitrogen, wherein the setting of this equilibrium is favored by the catalyst (e.g., nickel) used on the anode. By means of further processes which take place alongside the above-mentioned reactions, at thermodynamic equilibrium, carbon monoxide, methane and traces of higher hydrocarbons are also present, although the proportion of hydrogen amounts, for example, at 750° C. to approximately 80% of the theoretical total quantity.

Urea, as a hydrogen supplier, is therefore fundamentally suitable as a fuel for a fuel cell system. Different variants of its use and the advantages achievable therefrom will now be described.

In most embodiments of the method according to the invention, urea is not used as the sole fuel, but as an additional fuel which entirely or partially replaces a main fuel in one or more phases of the operation. Preferably, therefore, the fuel cell system comprises a reformer for generating a hydrogen-containing reformate from a hydrocarbon mixture, wherein the reformate is supplied to the fuel cell stack as a fuel at least during one phase of the operation. The hydrocarbon mixture is, in particular, a conventional fuel, for example, diesel or petrol, and the reformate serves as the main fuel for the fuel cell system.

Favorably, the fuel cell system also comprises a residual gas burner in which the fuel not converted on the anode side is oxidized. The heat thereby generated is used, in particular, to heat the cathode feed air by means of a layered structure heat-exchanger. Excess heat can be emitted by the system, for example, to the auxiliary heating unit of a motor vehicle in which the fuel cell system is installed.

The problems which can arise during the start phase of the fuel cell system due to heating of the fuel cell stack only on the cathode side and/or due to soot formation on the anode and/or due to a back flow of the oxidizing agent through the residual gas burner to the anode have already been described in the introduction. In a preferred embodiment of the method according to the invention, these problems can be prevented in that urea is supplied to the fuel cell stack as a fuel during the start phase. The start phase should be understood to mean the time period from putting the fuel cell system into operation until the intended operating temperature of the fuel cell stack is reached. Preferably, urea is supplied as the sole fuel during this start phase. In this way, several advantages are achieved: Firstly, due to the flow of fuel through the anode, in principle, a back flow of oxidizing agent from the residual gas burner is prevented. Since the decomposition products of the urea lead overall, across the whole temperature range, to a reducing atmosphere, oxidation of the anodic catalyst is thereby prevented. Also prevented is soot formation on the anode since this does not occur during the thermal decomposition of urea. Finally, the supplying of urea with suitable pre-heating also enables even heating of the fuel cell stack both over the anodes and also the cathodes, so that thermal stresses within the stack are prevented.

In this case, the quantity of urea supplied during the start phase can be varied depending on whether merely a back flow of the oxidizing agent by means of the residual gas burner is to be prevented or whether the fuel cell stack is also to be heated by means of the anodes. In the first case, a smaller quantity will be sufficient and the heating of the fuel cell stack takes place mainly by means of the pre-heated cathode air and occurs correspondingly more slowly. In the second case, the start phase can be shortened by means of a larger quantity of urea.

The fractions of the decomposition products of the urea that have not been converted at the anodes of the fuel cell stack (in particular hydrogen and, if applicable, carbon monoxide) can be subsequently combusted in a residual gas burner, as in the case of a reformate from a conventional fuel, wherein the heat generated is used for pre-heating the cathode air and, if applicable, the fuel.

According to a further preferred embodiment of the invention, which can be realized alternatively or particularly additionally, urea is supplied to the fuel cell stack as a fuel during an end phase of the operation. The end phase should be understood to be the period during which the fuel cell stack cools from the intended operating temperature to the ambient temperature. Preferably, during the end phase, urea is supplied as the sole fuel. According to the prior art, it is often provided that during the cooling of the fuel cell stack, no fuel and oxidizing agent are supplied at all. However, this has the disadvantage that exhaust gas flowing back can reach the anode and can enter into undesirable interactions with the catalyst there. By means of the supplying of urea during the cooling down, an exhaust gas back flow of this type can be prevented.

A further substantial advantage of the use of urea during an end phase of the operation of the fuel cell system lies in that the available urea contains no sulfur-containing compounds. Thus, the end phase of the operation can be used for regeneration of the anodic catalyst if the fuel cell system has previously been operated with a reformate made of a sulfur-containing fuel. It is known that the sulfur poisoning of the catalyst is, in principle, reversible if the application of a sulfur-free fuel is carried out. The fact that urea is commercially available in a pure form, i.e., without appreciable impurities, represents a further advantage regardless of the phase of the operation in which it is used.

According to a further embodiment of the invention, it can be provided that urea is supplied as a fuel to the fuel cell stack not only during the start phase and/or the end phase, but also during the operation between the start phase and the end phase. Favorably, in this case both a hydrogen-containing reformate (from a conventional fuel) and urea are supplied to the fuel cell stack.

The advantage of a combination of fuel reformate and urea is to be seen particularly therein that a simpler adjustment of the output of the fuel cell system is thereby enabled. Since the reformers used are mostly optimized for a particular throughput (according to a particular output of the fuel cell system) and a deviation from this throughput reduces the efficiency, it is particularly advantageous if the output of the fuel cell system is substantially varied by means of the quantity of urea supplied, whilst the quantity of reformate supplied is kept substantially constant. The reformer can be configured, in particular, such that it covers the base load of the system (e.g., 5 kW) and that for short-term increases in the required output, urea is supplied as additional fuel, the quantity of which can easily be varied, in contrast to the throughput of the reformer.

In the converse case, when the output requirement falls below the base load, it can be provided that the reformer is run down and that only urea is supplied as a fuel to the fuel cell stack in order to cover the reduced output demand.

Alternatively or in addition to the above-described variants, it can also be advantageous if exclusively urea is supplied to the fuel cell stack as a fuel during one or more regeneration phases. Similarly to the end phase, during such regeneration phases, the frequency and length of which are variable according to need, both sulfur compounds and deposited soot are at least partially removed again from the anode by means of an application of urea. A regeneration therefore takes place following each preceding operating phase with a fuel reformate.

According to a further embodiment of the invention, it can finally be provided that exclusively urea is supplied to the fuel cell stack as a fuel during the entire operation. On use of urea as the sole fuel, a reformer can be dispensed with so that the fuel cell system as a whole is simplified.

In all the embodiments of the method according to the invention as described above, the supplying of the urea to the fuel cell stack preferably takes place in the form of a vaporized aqueous urea solution. The presence of water is required for the generation of a hydrogen-containing gas mixture according to the thermodynamic equilibrium described above, since this is based in the first step on a hydrolysis of the urea to carbon dioxide and ammonia (water-free urea decomposes at approximately 130° C. to isocyanic acid and ammonia). Although it is also conceivable that the aqueous solution is first vaporized in the fuel cell stack, the supplying of an already gaseous composition is however preferable for technical reasons.

Through the provision of the urea as an aqueous solution, the storage, handling and refilling are extremely problem-free, in contrast to a gaseous or pressure-liquefied fuel such as, for example, hydrogen, the use of which requires a considerable technical effort on safety grounds. Urea is also safe from toxicological standpoints.

The aqueous urea solution that is used preferably has a concentration of 30% to 80% by weight. An increase in the concentration of the solution reduces the space requirement for a particular quantity of urea, whilst for the desired decomposition of the urea, an approximately equimolar quantity of water is required, which corresponds to a solution with a concentration of approximately 77% by weight.

Urea is also used in internal combustion engines of motor vehicles, particularly heavy goods vehicles, for reducing the nitrogen oxide content of the exhaust gas. For this purpose, a 32.5% by weight aqueous urea solution, which is injected into the exhaust gas stream, is sold commercially under the name "AdBlue". This solution, for which a suitable infrastructure already exists, can essentially also be used as a fuel in the context of the present invention, even though a somewhat greater urea concentration might possibly be more advantageous for this purpose.

In one embodiment of the invention, the aqueous urea solution is evaporated in a reformer, i.e., in the reformer provided for the reforming of a hydrocarbon mixture. This presents itself in particular if, in the context of the method, exclusively or overwhelmingly, a combined use of reformate and urea as a fuel is intended. In this case, no substantial additional components need be provided in the fuel cell system.

It is particularly favorable, however, if the aqueous urea solution is evaporated in a separate evaporating device of the fuel cell system. In this way, it is made possible to supply the fuel cell stack with urea as a sole fuel, this being particularly advantageous during the start phase and the end phase of the operation, as stated above. Through the separation of the urea supply from the reformer, any influencing of the processes taking place in the reformer can also be prevented.

The evaporated aqueous urea solution is preferably supplied to the fuel cell stack at a temperature of 700° C. or more, in particular at a temperature of 700° C. to 800° C., which corresponds to the preferred operating temperature of a solid oxide fuel cell. However, operation with urea at temperatures of above 800° C. is also possible and the equilibrium composition of the gas mixture resulting during the decomposition of the urea changes only insubstantially at higher temperatures.

The present invention also relates to a fuel cell system having a fuel cell stack to which a fuel can be supplied on the anode side and an oxidizing agent can be supplied on the cathode side.

The object of the present invention is achieved with the fuel cell system in that it comprises an evaporating device for an aqueous urea solution, wherein the evaporated aqueous urea solution can be supplied to the fuel cell stack as a fuel.

Advantages and preferred embodiments of the fuel cell system according to the invention have already been described in conjunction with the method according to the invention. The fuel cell system according to the invention is suitable in particular for carrying out the method according to the invention.

The invention also relates to the use of urea as a fuel for a fuel cell system.

The present invention is suitable, in particular, for use in fuel cell systems which serve as auxiliary power units on board motor vehicles for generating electrical energy. However, the invention is not restricted to this field of use, but rather is suitable also, for example, for fuel cell systems in stationary uses.

This and other advantages of the invention will now be described in greater detail based on the following exemplary embodiments, making reference to the drawings.

DETAILED DESCRIPTION OF THE INVENTION

Figure 1:
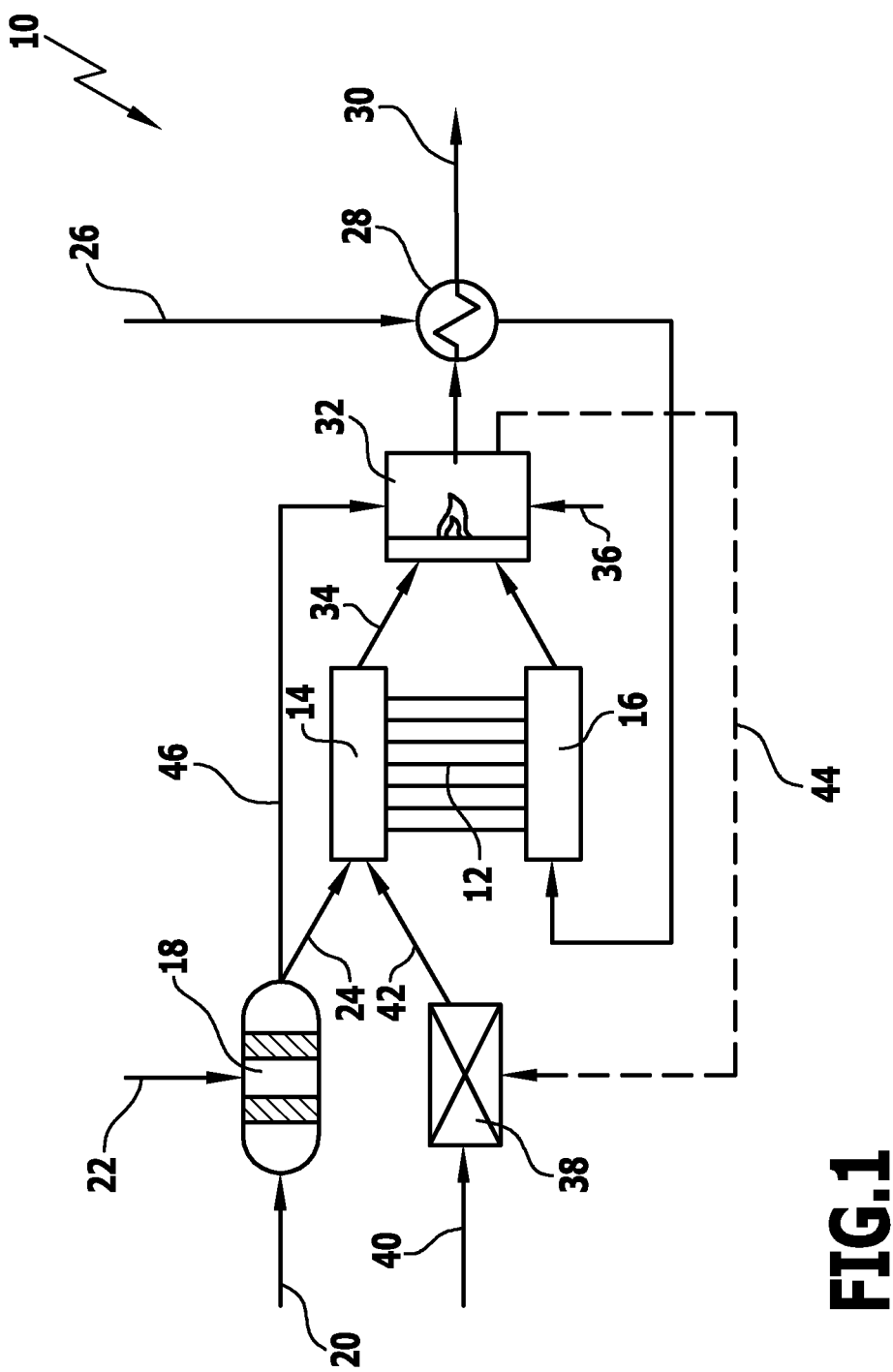
FIG. 1 shows a schematic representation of a fuel cell system according to the invention.

FIG. 1 shows schematically a fuel cell system according to the invention which is identified overall as 10. The fuel cell system 10 comprises a fuel cell stack 12 with a plurality of anodes and cathodes which are shown here, in a simplified form, as anode 14 and cathode 16. The fuel cell stack 12 involves a high temperature fuel cell, in particular a solid oxide fuel cell (SOFC).

Connected upstream of the anode 14 is a reformer 18 with which a reformate 24 containing hydrogen can be generated by partial oxidation with atmospheric oxygen 22 from a fuel 20, for example, diesel or petrol, supplied thereto. This reformate 24 can be supplied to the anode 14 as a fuel.

Atmospheric oxygen 26 can be supplied to the cathode 16 as the oxidizing agent, said cathode supply air 26 being pre-heated by means of a layered structure heat-exchanger 28. The heat supplied to the layered structure heat-exchanger 28 derives from the exhaust gas stream 30 of a residual gas burner 32 in which fuel 34 not converted at the anode 14 is subsequently burned with additional atmospheric oxygen 36.

The above-described components of the fuel cell system 10 correspond to the prior art in corresponding systems as used, in particular, as an auxiliary power unit for generating electrical energy on board motor vehicles. However, the fuel cell system 10 according to the invention also comprises an evaporating device 38 connected upstream of the anode 14 for an aqueous urea solution 40, wherein the evaporated aqueous urea solution 42 can be supplied to the fuel cell stack 12 as a fuel. The energy required for evaporating the urea solution 40 is made available wholly or partially by means of the residual gas burner 32, as indicated by the dashed line 44. In detail, this can be achieved by different means, for example, by means of a heat exchanger or by structural integration of the evaporating device 38 in the residual gas burner 32.

If the heat generated by the residual gas burner 32 is not sufficient to pre-heat both the cathode supply air 26 and to make available the energy required for evaporation of the aqueous urea solution 40, an additional burner (not shown in the drawing) in which fuel 20 is burned can also be provided in the fuel cell system 10. Excess heat from the exhaust gas stream 30, however, can be used externally, for example, for an auxiliary heating unit of the motor vehicle.

In the method according to the invention for operating the fuel cell system 10, the evaporated urea solution 42 is supplied to the fuel cell stack 12 as a fuel at least during one phase of the operation. The evaporated urea solution 42 can be supplied as the sole fuel or in combination with the reformate 24.

Particularly advantageous is the supplying of the evaporated urea solution 42 as the sole fuel during the start phase of the fuel cell system 10 when the fuel cell stack 12 has not yet reached its intended operating temperature (preferably 700° C. to 800° C.), so that supplying the reformate 24 would lead to the deposition of soot on the anode 14, or a back flow of cathode supply air 26 from the residual gas burner 32 would lead to oxidation of the anodic catalyst (e.g., nickel). By using urea as the sole fuel during the start phase, both problems can be effectively prevented. During the start phase, the reformate generated during the running up of the reformer 18 can be supplied directly to the residual gas burner 32 by means of a bypass 46.

Similar advantages also result from the use of the evaporated urea solution 42 as the sole fuel during the end phase of the operation when the reformer 18 is no longer in operation and the fuel cell stack 12 cools down from its operating temperature. The evaporated urea solution 42 acts in this case as a protective gas which hinders oxidation at the anode 14 by back-flowing cathode supply air 26 from the residual gas burner 32.

It can also be provided within the scope of the method according to the invention that the evaporated urea solution 42 is also supplied to the anode 14 as a fuel during the operation between the start phase and the end phase, and particularly in combination with the reformate 24. By means of dosing of the evaporated urea solution 42, it is possible, in particular, to react flexibly to varying output demands placed on the fuel cell system 10 since the throughput of the reformer 18 is usually optimized to a relatively fixed value and deviations from this value lead to efficiency losses.

The evaporated aqueous urea solution 42 is favorably supplied to the fuel cell stack 12 at the relevant operating temperature of the fuel cell stack 12, particularly in a range from 700° C. to 800° C. Within this temperature range, during thermodynamic equilibrium, a gas mixture resulting from the aqueous urea solution is present which consists essentially of water, hydrogen, nitrogen, carbon dioxide and carbon monoxide.

Figure 2:
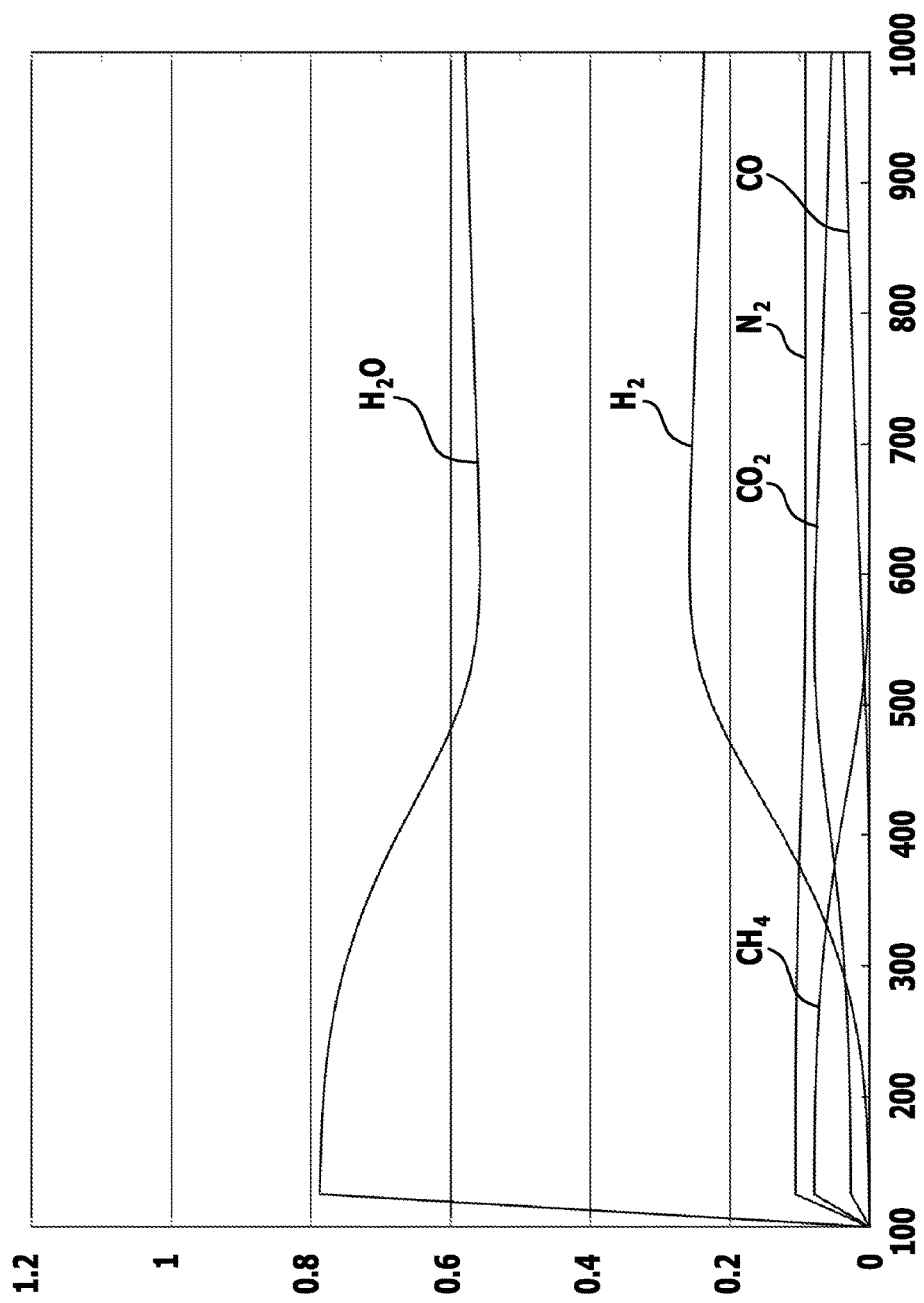
FIG. 2 shows a graph relating to the composition of the gas mixture arising during the decomposition of urea, as a function of temperature.

In the graph in FIG. 2, the composition of this gas mixture is shown during the respective thermodynamic equilibrium over a temperature range from 125° C. to 1000° C., starting from a solution of 32.5% by weight of aqueous urea, which is commercially available under the designation "AdBlue". Shown on the abscissa is the temperature in degrees Celsius and shown on the ordinate is the partial pressure of the individual compounds, in atm.

As shown in the graph, in the relevant temperature range from 700° C. to 800° C., practically only water, hydrogen, nitrogen, carbon monoxide and carbon dioxide are present. Methane is essentially only present below approximately 500° C. The proportion of ammonia over the whole of the temperature range shown is below 0.1% and the proportion of higher hydrocarbons is less than 1 ppm. No soot is formed.

The quantity of hydrogen present during equilibrium at approximately 750° C. corresponds to approximately 80% of the maximum possible quantity. Based on these values, it can be calculated that, given the same power level and the same electrochemical usage, approximately 6.5 times the volume of a solution of 32.5% by weight of urea is needed, as compared with diesel fuel, in order to achieve the same current equivalent. By increasing the urea concentration, the required volume can be reduced accordingly.

That which is claimed:

1. A method for operating a fuel cell system having a fuel cell stack comprising a high temperature fuel cell, to which a fuel is supplied on the anode side and an oxidizing agent is supplied on the cathode side,
   wherein at least during one phase between a start phase and an end phase of the operation of the fuel cell system, both a hydrogen-containing reformate and urea are supplied to the fuel cell stack as a fuel.

2. The method according to claim 1, wherein the fuel cell system comprises a reformer for generating the hydrogen-containing reformate from a hydrocarbon mixture.

3. The method according to claim 1, wherein the fuel cell system comprises a residual gas burner in which the fuel not converted on the anode side is oxidized.

4. The method according to claim 1, wherein urea is supplied to the fuel cell stack as a fuel during a start phase of the operation.

5. The method according to claim 1, wherein urea is supplied to the fuel cell stack as a fuel during an end phase of the operation.

6. The method according to claim 1, wherein an output of the fuel cell system is substantially varied by means of the quantity of urea supplied, whilst the quantity of reformate supplied is kept substantially constant.

7. The method according to claim 1, wherein exclusively urea is supplied to the fuel cell stack as a fuel during one or more regeneration phases.

8. The method according to claim 1, wherein the urea is supplied to the fuel cell stack in the form of an evaporated aqueous urea solution.

9. The method according to claim 8, wherein the aqueous urea solution has a concentration of urea of 30% to 80% by weight of the aqueous urea solution.

10. The method according to claim 8, wherein the aqueous urea solution is evaporated in a reformer.

11. The method according to claim 8, wherein the aqueous urea solution is evaporated in a separate evaporating device of the fuel cell system.

12. The method according to claim 8, wherein the evaporated aqueous urea solution is supplied to the fuel cell stack at a temperature of 700° C. or more.

13. A fuel cell system with a fuel cell stack comprising a high temperature fuel cell, to which a fuel is supplied on the anode side and an oxidizing agent is supplied on the cathode side,
   wherein the fuel cell system comprises a reformer generating a hydrogen-containing reformate from a hydrogen mixture,
   wherein the fuel cell system comprises an evaporating device which is separate from the reformer, in which device an aqueous urea solution is evaporated, and
   wherein the evaporated aqueous urea solution is supplied to the fuel cell stack as a fuel, alone or in combination with the reformate.

* * * * *